(12) United States Patent
Sidebottom et al.

(10) Patent No.: US 7,733,884 B1
(45) Date of Patent: Jun. 8, 2010

(54) SYSTEMS AND METHODS FOR EXPOSING FUNCTIONALITY WITH STRICT ACCESS CONTROLS

(75) Inventors: Gregory Sidebottom, Ottawa (CA); Hugh Stewart, Nepean (CA)

(73) Assignee: Juniper Networks, Inc., Sunnyvale, CA (US)

( * ) Notice: Subject to any disclaimer, the term of this patent is extended or adjusted under 35 U.S.C. 154(b) by 1918 days.

(21) Appl. No.: 10/751,539

(22) Filed: Jan. 6, 2004

(51) Int. Cl.
*H04L 12/56* (2006.01)
(52) U.S. Cl. .......................................... 370/401; 705/54
(58) Field of Classification Search ........................ None
See application file for complete search history.

(56) References Cited

U.S. PATENT DOCUMENTS

| | | | |
|---|---|---|---|
| 2003/0055968 A1* | 3/2003 | Hochmuth et al. ........... | 709/226 |
| 2003/0101246 A1* | 5/2003 | Lahti ........................... | 709/221 |
| 2003/0139174 A1* | 7/2003 | Rao ............................. | 455/418 |
| 2003/0212904 A1* | 11/2003 | Randle et al. ................ | 713/200 |
| 2003/0220872 A1* | 11/2003 | Chandrashekhar et al. .... | 705/40 |
| 2005/0073982 A1* | 4/2005 | Corneille et al. ............. | 370/338 |
| 2006/0112400 A1* | 5/2006 | Zhang et al. ................. | 719/328 |

* cited by examiner

*Primary Examiner*—Jayanti K Patel
*Assistant Examiner*—Anthony Sol
(74) *Attorney, Agent, or Firm*—Harrity & Harrity, LLP

(57) ABSTRACT

A service provider system connects to systems associated with a group of business-partners. Each of the business-partners sells services, of an extensible set of services provided by the service provider system, to its customers. The service provider system provides a common interface via which the business-partner systems can request one or more services from the extensible set of services. The service provider system exposes subsets of the common interface to each of the business-partner systems by controlling access to the extensible set of services by the business-partner systems.

22 Claims, 7 Drawing Sheets

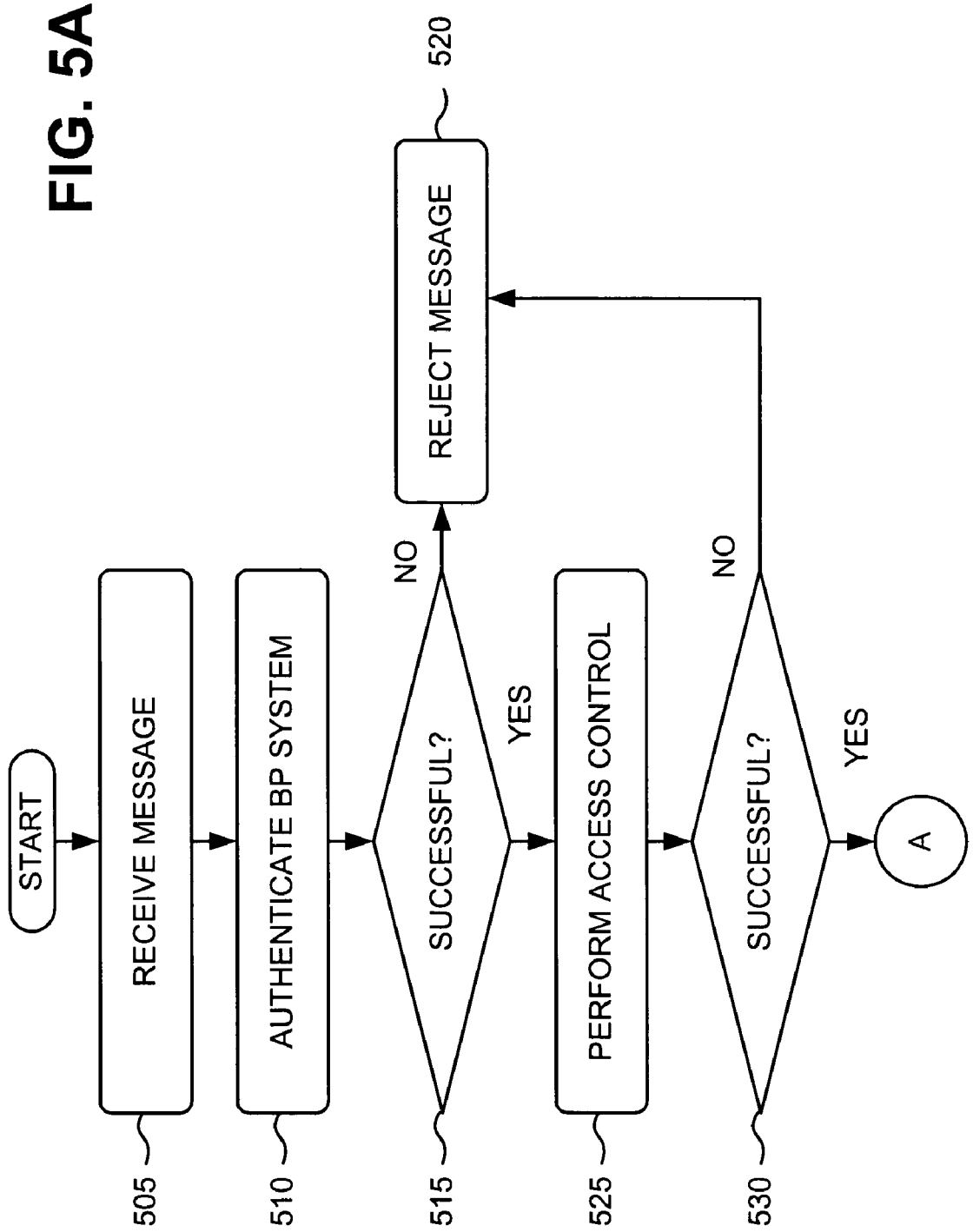

SYSTEMS AND METHODS FOR EXPOSING FUNCTIONALITY WITH STRICT ACCESS CONTROLS

FIELD OF THE INVENTION

The present invention relates generally to network communication and, more particularly, to systems and methods for exposing arbitrary functionality to business partners via an interface and strict access controls.

BACKGROUND OF THE INVENTION

Networks, such as the Internet, have become an increasingly important part of our everyday lives. Millions of individuals now access the Internet on a daily basis to shop for goods and services, obtain information of interest (e.g., streaming video and/or audio), and communicate with friends, family, and co-workers (e.g., via e-mail). Network service providers own the network equipment via which these individuals connect to the Internet. Business partners oftentimes enter into a business relationship with the network service providers to sell the network service providers' network services to their customers.

Network service providers typically provide undifferentiated or marginally differentiated (e.g., with few options) access to the network via a mostly manual order processing/provisioning interface. A few network service providers have automated this interface, but provide the same interface to all of their business partners.

Accordingly, there is a need for mechanisms that may be used by network service providers to expose arbitrary functionality to business partners to thereby allow the business partners to provide differentiated services to their customers as compared to other business partners of the same network service provider.

SUMMARY OF THE INVENTION

Systems and methods consistent with the principles of the invention address this and other needs by providing an extensible interface to business partners via which the business partners may access particular functionality. Using highly granular access control, the business partners may be permitted access to all or only a portion of the functionality offered by a network service provider.

In accordance with one aspect consistent with the principles of the invention, a system for providing services is provided. The system may include a gateway connected to a service activation component. The service activation component may offer an extensible set of services. The gateway is configured to provide access control to the services offered by the service activation component.

According to another aspect, a system for providing access to network services is provided. The system may include means for providing an extensible set of network services, means for receiving, from retailers, requests for ones of the network services, and means for providing subsets of a common interface to different ones of the retailers using access control, where the retailers access the extensible set of network services via the subsets of the common interface.

According to yet another aspect, a method for providing services is provided. The method may include providing an extensible set of services, receiving a message requesting ones of the services, performing access control with regard to the message, and selectively providing the service based, at least in part, on a result of the access control.

According to a further aspect, a service gateway in communication with a first entity and a second entity is provided. The service gateway may include first and second interface modules and an access control module. The first interface module is configured to receive, from the first entity, a message requesting performance of a service by the second entity, where the message includes a service name and an argument corresponding to the service. The access control module is configured to determine whether the first entity is permitted to request performance of the service corresponding to the service name, determine whether the first entity is permitted to provide the argument, and determine whether the argument is permissible for the service corresponding to the service name. The second interface module is configured to selectively request performance of the service on the second entity based, at least in part, on results of the determinations of the access control module.

According to another aspect, a network wholesaler system connected to a group of retailer systems, associated with a corresponding group of retailers, is provided. Each of the retailers may sell services, of an extensible set of services provided by the wholesaler system, to its customers. The wholesaler system may provide a common interface via which the retailer systems request one or more services from the extensible set of services. The wholesaler system may expose subsets of the common interface to each of the retailer systems by controlling access to the extensible set of services by the retailer systems.

According to yet another aspect, a wholesaler system that provides services to subscribers associated with a group of retailer systems is provided. The wholesaler system may include a service activation component and a service gateway that is configured to act as a single point of contact between the retailer systems and the service activation component. The service activation component is configured to provide the services to the subscribers. The service gateway may provide controlled access, by the retailer systems, to the services provided by the service activation component. The service gateway may permit each of the retailer systems access to a subset of the services provided by the service activation component via the controlled access.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5A and 5B are flowcharts of exemplary processing for obtaining an arbitrary functionality according to an implementation consistent with the principles of the invention.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention provide a common interface to business partners. Subsets of the common interface may be exposed to the business partners using highly granular access control.

The description to follow may use terms, such as "network service provider" and "business partner," when describing certain entities in a network. Generally, a business partner may own a customer relationship with its subscribers and a network service provider may have a hardware relationship with these subscribers. The network service provider may own and maintain network equipment that may be used by the subscribers. The business partner may purchase services from one or more network service providers and sell the services to its subscribers. Examples of such services might include Internet service, video-on-demand service, video conferencing service, firewall service, gaming service, etc. Though described in the context of providing network services, implementations consistent with the principles of the invention may be equally applicable to other contexts where there is some business relationship between the service provider (also sometimes called a "wholesaler") and the business partner (also sometimes called a "retailer"), whether associated with different business entities or the same business entity.

Exemplary Network

Figure 1:
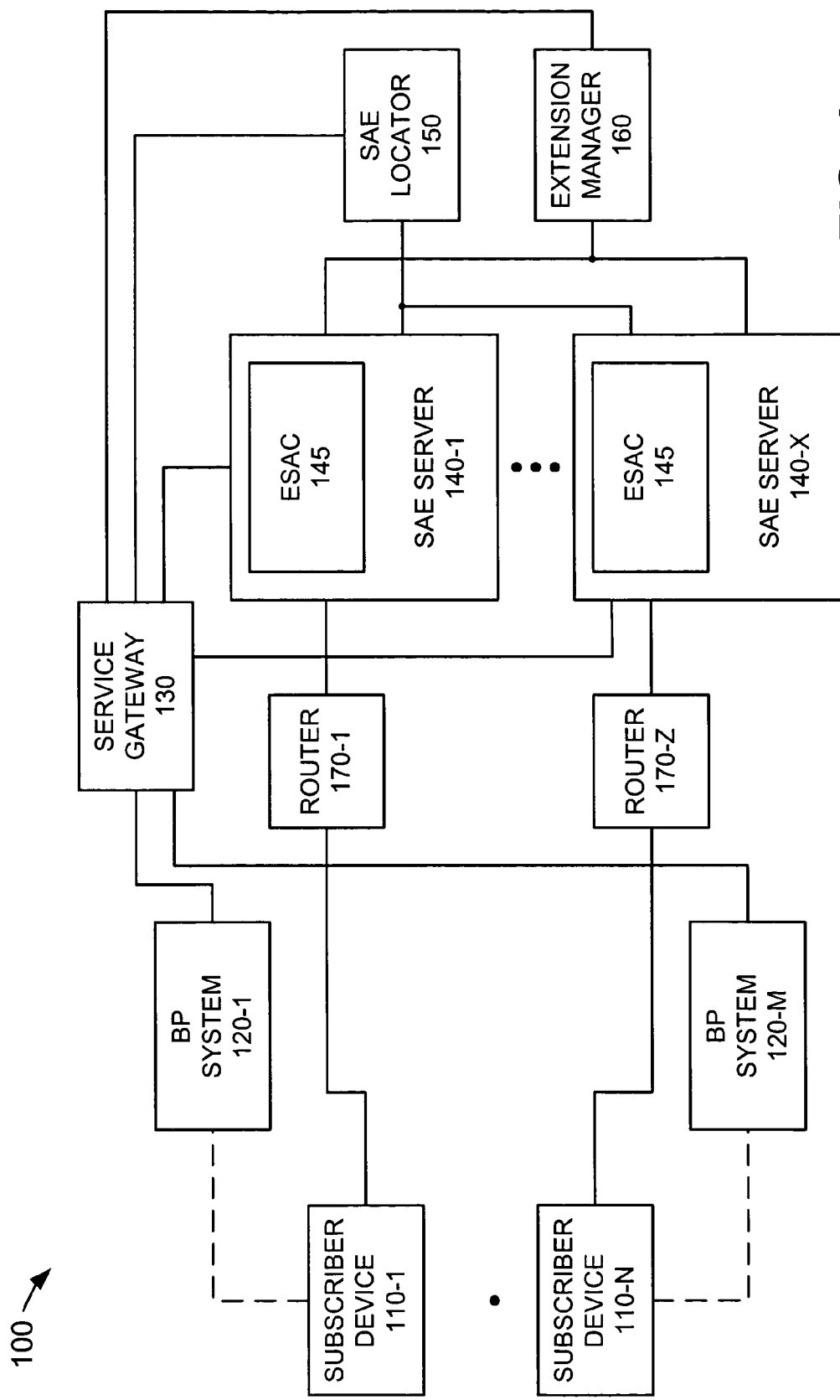
FIG. 1 is a diagram of an exemplary network in which systems and methods consistent with the principles of the invention may be implemented.

FIG. 1 is a diagram of an exemplary network 100 in which systems and methods consistent with the principles of the invention may be implemented. As illustrated, network 100 may include a group of subscriber devices 110-1 through 110-N (collectively referred to as subscriber devices 110) and business partner (BP) systems 120-1 through 120-M (collectively referred to as BP systems 120). Network 100 may also include a service gateway 130, service activation engine (SAE) servers 140-1 through 140-X (collectively referred to as SAE servers 140), an optional SAE locator 150, an optional extension manager 160, and routers 170-1 through 170-Z (collectively referred to as routers 170). It will be appreciated that the number of devices illustrated in FIG. 1 is provided for simplicity. In practice, a typical system may include more or fewer components than illustrated in FIG. 1. Moreover, network 100 may include other components (not shown) that aid in the reception, processing, and/or transmission of data.

Subscriber devices 110 may include any device capable of transmitting and/or receiving data. For example, subscriber devices 110 may include a personal computer, a laptop computer, a personal digital assistant (PDA), a television, a telephone device, a video game console, or the like. Subscriber devices 110 may connect to a network service provider's network via one or more routers 170, any type of network link, such as wired, wireless, and/or optical connections, and possibly any type of network or network equipment, such as a cable modem network, a digital subscriber line access multiplexer (DSLAM), etc. Subscriber devices 110 may have logical connections to BP systems 120.

BP systems 120 may include one or more components that provide services to subscriber devices 110 based on the one or more network service providers' networks. For example, BP systems 120 may provide advanced network services to its subscribers. BP systems 120 may permit their subscribers to change their network experience both rapidly and dynamically (e.g., possibly on-the-fly) by, for example, requesting one or more SAE servers 140 to control router(s) 170 to which the subscribers connect.

Service gateway 130 may include gateway hardware and/or software that provide an interface between BP systems 120 and SAE servers 140. Service gateway 130 may provide a single point of contact through which BP systems 120 can invoke functionality on SAE servers 140. During operation, service gateway 130 may receive messages from BP systems 120, forward them to appropriate ones of SAE servers 140, and return responses to BP systems 120. As will be described in more detail below, service gateway 130 may also perform access control to restrict access by BP systems 120 to services or operations that the network service providers' networks permit them to access.

SAE servers 140 may include computer devices that perform functions to deliver a requested service to a subscriber device 110-$n$ (where subscriber device 110-$n$ refers to one of subscriber devices 110). In one implementation, SAE servers 140 perform functions to configure router 170 to deliver the requested service. SAE servers 140 may each include one or more extensible service activation components (ESACs) 145. One ESAC 145 is illustrated in each SAE server 140-$x$ (where SAE server 140-$x$ refers to one of SAE servers 140) in FIG. 1 for simplicity.

Each ESAC 145 may include a control interface by which service gateway 130 may control ESAC 145 to perform a service on behalf of a subscriber device 110-$n$. Each ESAC 145 may be capable of performing the same or different services. These services may include, for example, providing higher quality of service for network accesses by subscriber devices 110. ESAC 145 may be implemented in hardware, software, or a combination of hardware and software.

SAE locator 150 may include a distributed network component that aids in identifying a SAE server 140-$x$ that is currently associated with a particular subscriber device 110-$n$. SAE locator 150 may, for example, be implemented in software and/or hardware on different network devices in network 100. These distributed software and/or hardware components may communicate with each other and with SAE servers 140, read and write data from/to a lightweight directory access protocol (LDAP) directory, and answer requests from, for example, service gateway 130, regarding the identity of one of SAE servers 140 that is currently associated with a particular one of subscriber devices 110.

SAE locator 150 may maintain a record of which subscriber devices 110 are associated with which SAE servers 140. SAE servers 140 may periodically inform SAE locator 150 of their associated subscriber devices 110 (possibly based on when subscriber devices 110 log in and log out). Thereafter, given a piece of information that uniquely identifies a subscriber device 110-$n$ (e.g., an Internet protocol (IP) address, a login name, a media access control (MAC) address, a layer 2 address, or a combination of these), SAE locator 150 may determine which of SAE servers 140 is currently managing a router 170-$z$ (where router 170-$z$ refers to one of routers 170) to which subscriber device 110-$n$ connects. Due to the existence of SAE locator 150, BP systems 120 may invoke functionality on SAE servers 140 without having to find and contact individual SAE servers 140.

Extension manager 160 may include a computer device that has centralized access to SAE servers 140 to facilitate the creation, addition, and/or modification of functionality on ESACs 145. For example, extension manager 160 may facilitate development of different functionality based on particular requirements of BP systems 120. Extension manager 160 may then provide this functionality to one or more of ESACs 145.

Exemplary Service Gateway

Figure 2:
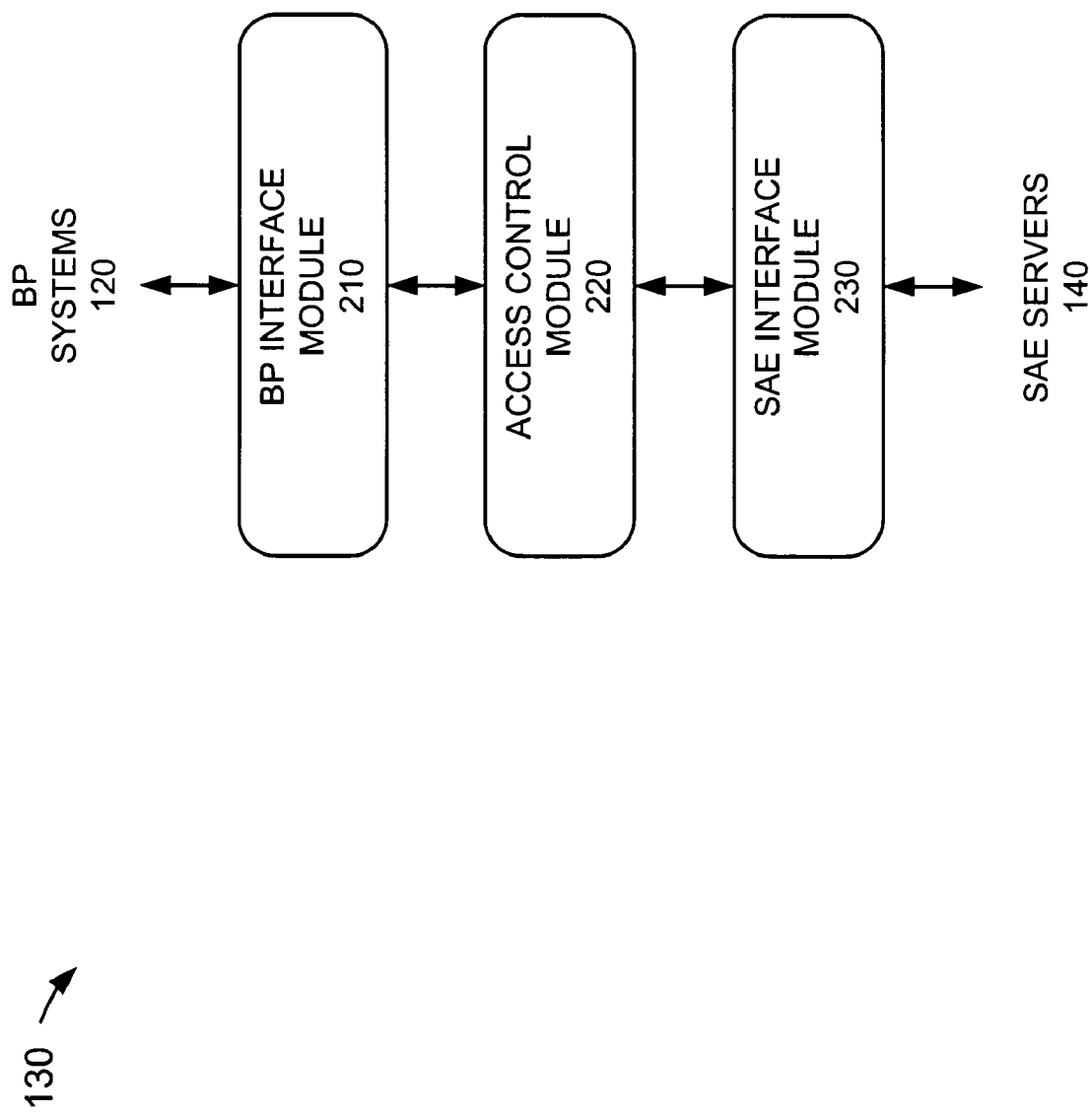
FIG. 2 is an exemplary functional block diagram of the service gateway of FIG. 1 according to an implementation consistent with the principles of the invention.

FIG. 2 is an exemplary functional block diagram of service gateway 130 according to an implementation consistent with the principles of the invention. Service gateway 130 may include BP interface module 210, access control module 220, and SAE interface module 230. BP interface module 210 may interact with BP systems 120 to receive messages and send responses.

Figure 3:
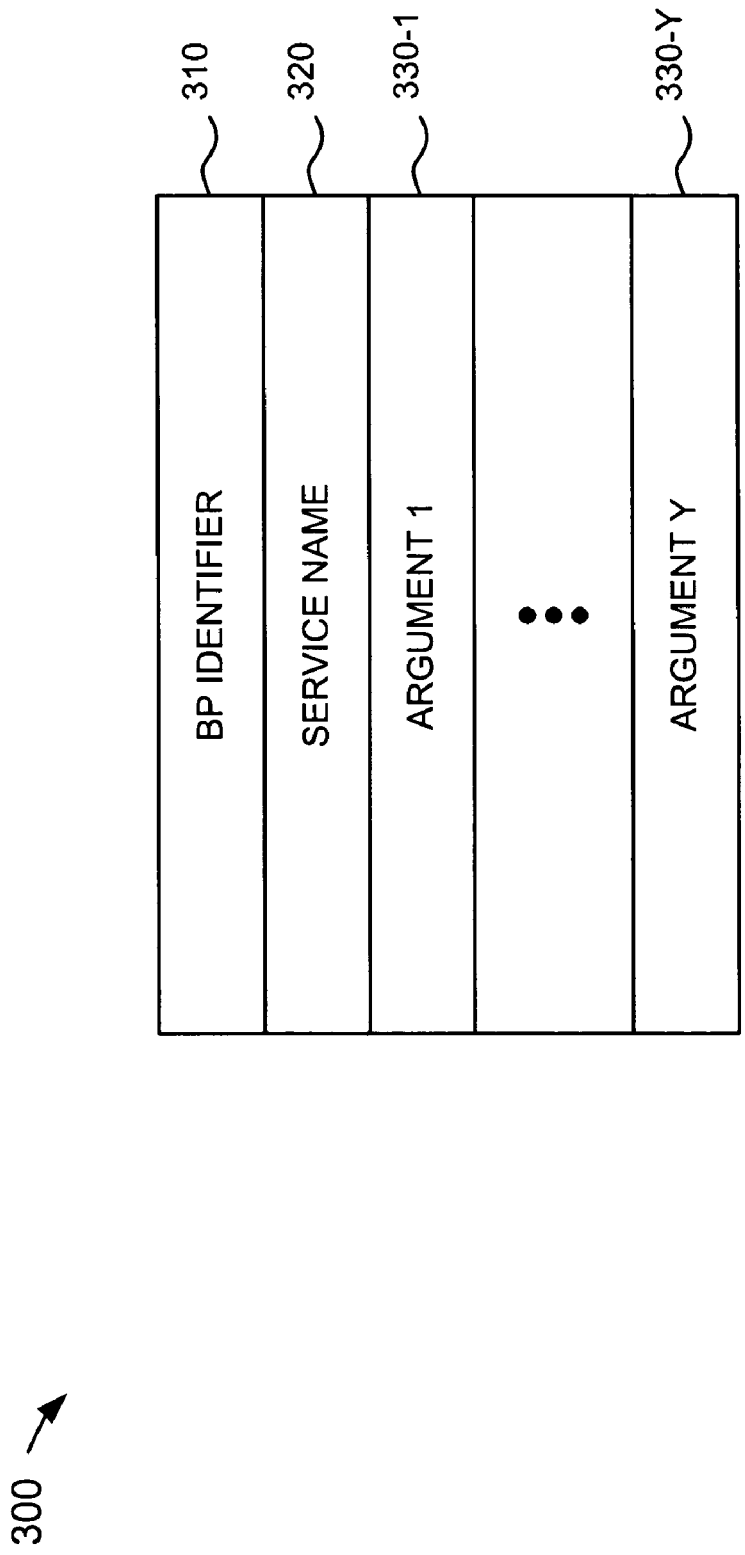
FIG. 3 is an exemplary diagram of a message according to an implementation consistent with the principles of the invention.

FIG. 3 is a diagram of an exemplary message 300 that may be received by service gateway 130 according to an implementation consistent with the principles of the invention. Message 300 may include a BP identifier 310, a service name 320, and one or more arguments 330-1 through 330-Y (collectively referred to as arguments 330). It will be appreciated that message 300 may include other or different fields (not shown) than those illustrated in FIG. 3. For example, message 300 might include a separate subscriber identifier field that uniquely identifies one or more of subscriber devices 110 using, for example, an IP address, a login name, a MAC address, a layer 2 address, or a combination of these.

BP identifier 310 may uniquely identify a business partner associated with a BP system 120-$m$ (where BP system 120-$m$ refers to one of BP systems 120) that sent the message to service gateway 130. For example, BP identifier 310 may include credentials (e.g., a password or certificate) as well as information that identifies a business partner associated with BP system 120-$m$ (e.g., a user name). Service name 320 may correspond to some service that BP system 120-$m$ wants performed on behalf of a subscriber device 110-$n$. An exemplary service name 320 might include a request to modify a subscriber's current status or data (e.g., activate a service or subscribe to a service).

Argument(s) 330 may include data that may be needed to perform the service associated with service name 320. Exemplary arguments 330 might include "firewall" and "port 139." In this case, BP system 120-$m$ may request the activation of the firewall service to affect data attempting to reach port 139 of the corresponding subscriber device 110-$n$. Argument(s) 330 might also include a subscriber identifier that uniquely identifies one or more of subscriber devices 110 using, for example, an IP address, a login name, a MAC address, a layer 2 address, or a combination of these.

Returning to FIG. 2, upon receiving a message, BP interface module 210 may authenticate BP system 120-$m$ in a conventional manner using BP identifier 310 from the message. This authentication might include a verification of the credentials of the business partner and/or a determination of whether this particular business partner is permitted to communicate with service gateway 130. If the authentication is successful, then BP interface module 210 may pass control to access control module 220.

Access control module 220 may provide access control to the services that can be performed by ESACs 145. Using these access controls, the network service provider may give different business partners controlled access to all or a portion of the code in a ESAC 145.

For example, access control module 220 may determine whether a particular business partner can access a particular service that is specified by service name 320 (FIG. 3). Access control module 220 may also determine whether the particular argument(s) 330 are valid and permissible for this particular business partner, this particular service name 320, or a combination of this business partner and this service name 320. In other words, access control module 220 may control which business partners can access which services and may further control which arguments 330 the business partners can provide for the services that they are permitted to access. As such, these access controls may be configurable on a per-business partner, per-service, per-argument basis.

To facilitate these determinations, access control module 220 may use a server or database that records what services each business partner is permitted to access and what arguments this business partner is permitted to provide for each of these services. In other words, each of business partner may be permitted access to only particular services on ESACs 145 and may be permitted to provide only certain arguments with regard to each of these services. Accordingly, code for a particular functionality (e.g., start a service for a subscriber, where both the service and the subscriber are specified in arguments 330) can be written once and made available to multiple business partners, but the arguments accepted from each of the business partners can be restricted (e.g., requests from a specific business partner identified as "CartoonsForKidsInc" to invoke a specific service identified as "startHighBandwidthService" could be rejected unless that business partner supplies as one of the arguments for the service a bandwidth that is greater than 1,000,000 bits per second).

If the determinations of access control module 220 are satisfactory, then control may pass to SAE interface module 230. SAE interface module 230 may identify one of SAE servers 140 (e.g., SAE server 140-$x$) on which to invoke the requested service. For example, SAE interface module 230 may use the subscriber identifier to identify the particular one of SAE servers 140 on which to invoke the functionality requested in the message. To accomplish this, SAE interface module 230 may send the subscriber identifier to SAE locator 150 to obtain identification of one of SAE servers 140 that is currently managing router 170-$z$ to which the subscriber device corresponding to the subscriber identifier is connected. SAE interface module 230 may then pass the entire message (or a portion of it) onto the identified SAE server 140-$x$.

Service gateway 130 might also handle responses that were generated as a result of performing the desired services on ESACs 145. A response may include an arbitrary string that includes whatever the service is designed to return. The response might include a success/failure indicator, an extensible markup language (XML) document, a hypertext markup language (HTML) document, and/or a data structure in a format used by a BP system 120-$m$. SAE interface module 230 may receive these responses and pass them onto BP interface module 210, which, in turn, forwards them to the appropriate ones of BP systems 120.

Exemplary Sae Server

Figure 4:
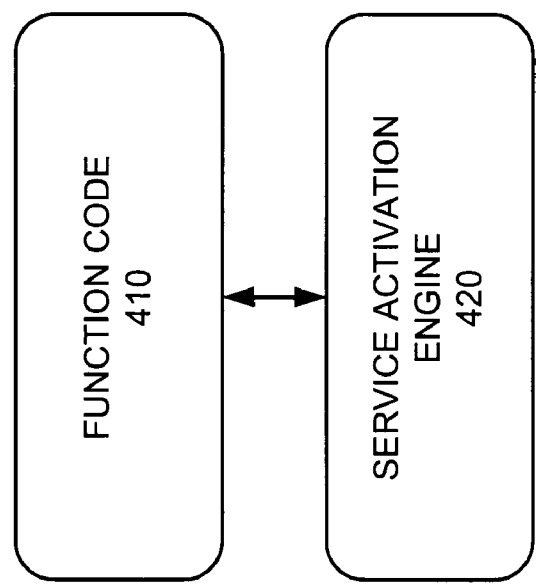
FIG. 4 is an exemplary functional block diagram of a service activation engine server of FIG. 1 according to an implementation consistent with the principles of the invention.

FIG. 4 is an exemplary functional block diagram of a portion of a SAE server 140-$x$ according to an implementation consistent with the principles of the invention. SAE server 140-$x$ may include function code 410 and service activation engine 420. Function code 410 may reside within ESAC 145 and may include extensible code for performing various functions on SAE server 140-$x$. The code is extensible in the sense that it is easy to change and/or add functionality that may be made selectively accessible by BP systems 120 using the access controls. In this case, the network service provider can develop fewer general, but powerful services, forming a common interface, and then restrict what each of BP systems 120 can do with each service via BP-specific, service-specific constraints on the arguments. The network service provider, thus, reduces BP-specific development efforts, replacing that effort with much simpler changes to the access control configuration.

Service activation engine 420 may receive the message (or a portion of the message) from service gateway 130 and invoke the appropriate code within function code 410. For example, service activation engine 420 may use service name 320 and argument(s) 330 to invoke a particular functionality on behalf of the subscriber device identified by the subscriber identifier. Execution of the code may result in a success or failure. Function code 410 may use the result to form an appropriate response and send the response to service gateway 130.

Exemplary Processing

Figure 5B:
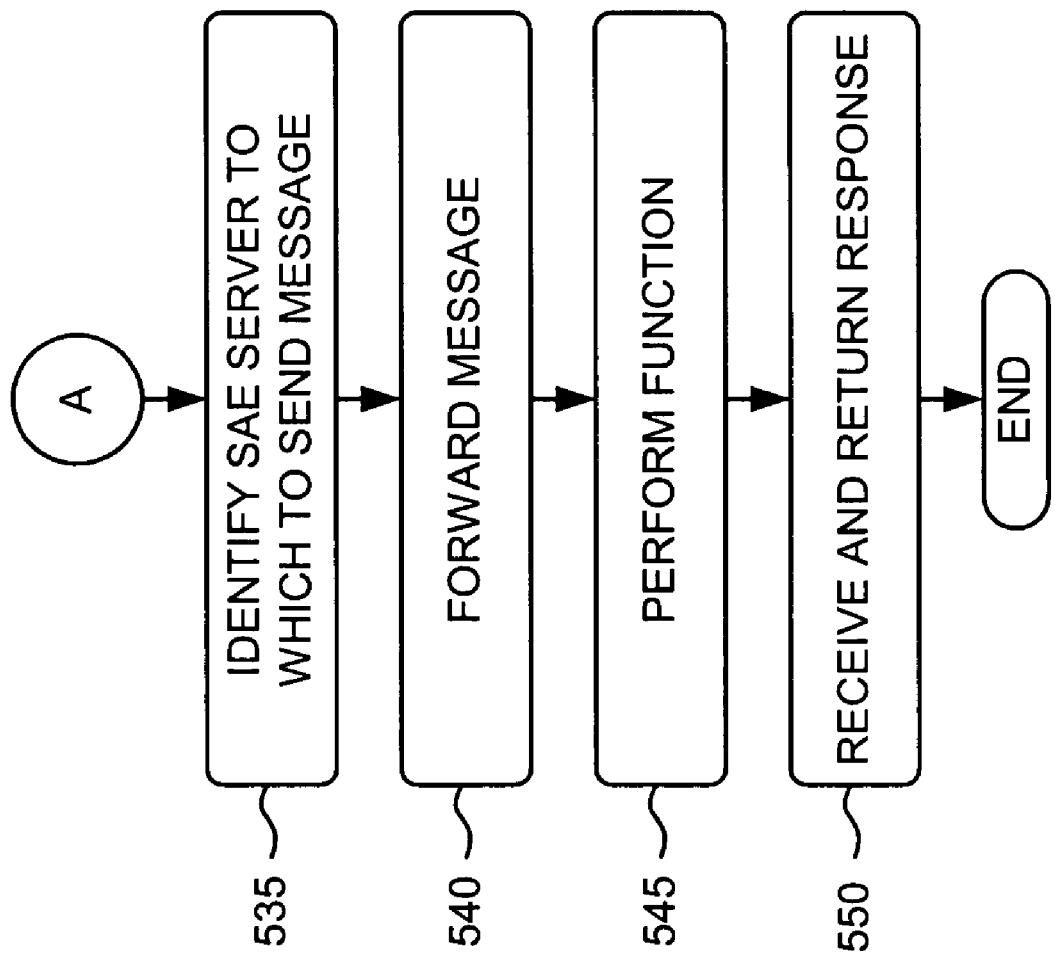

FIGS. 5A and 5B are flowcharts of exemplary processing for invoking functionality on an ESAC 145 on behalf of a subscriber device 110-*n* according to an implementation consistent with the principles of the invention. Processing may begin with a subscriber device 110-*n* contacting a BP system 120-*m* to request invocation of some functionality. This functionality may be associated with services on one of SAE servers 140. Alternatively, this functionality may be associated with services of a BP system 120-*m* (e.g., starting a video stream). In this case, BP system 120-*m* may invoke functionality on one of SAE servers 140 to facilitate the providing of the services by BP system 120-*m*. Assume, for purposes of this example, that subscriber device 110-*n* desires to invoke a firewall service that affects data attempting to reach port 139 of subscriber device 110-*n*.

Figure 6:
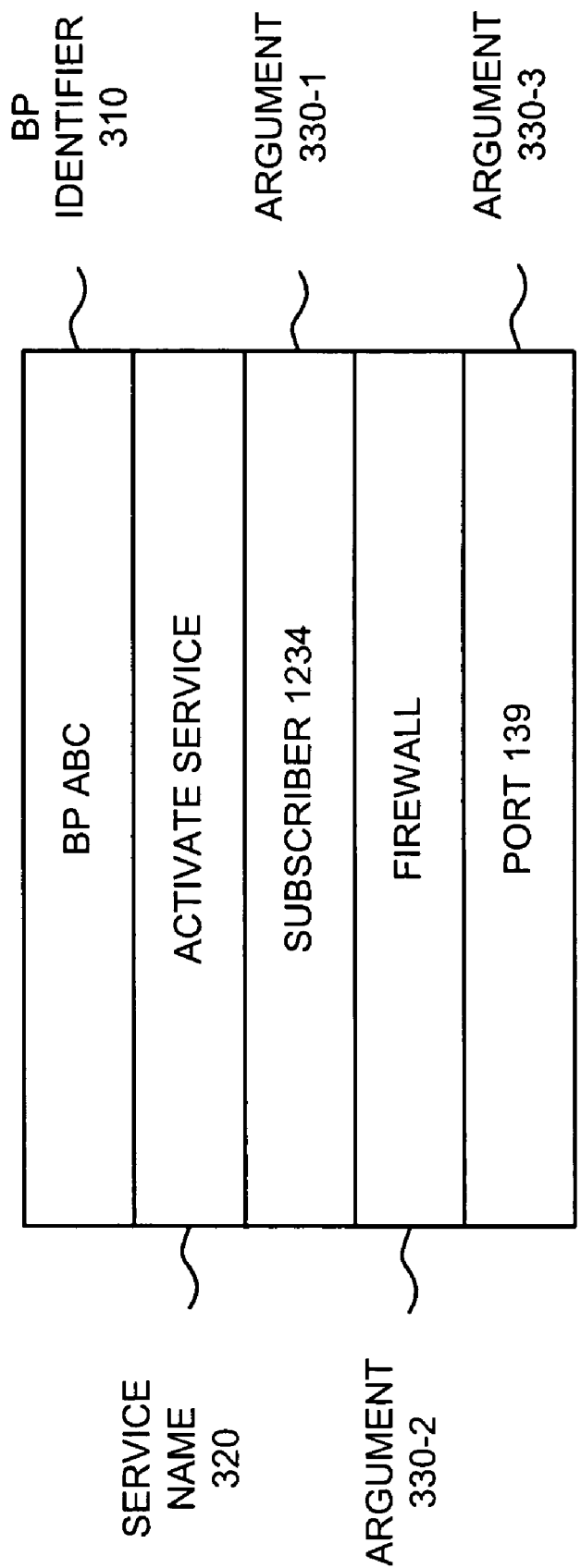
FIG. 6 is a diagram of a message that may be generated by a business partner system according to an exemplary implementation.

BP system 120-*m* may generate a message for invoking the service. FIG. 6 is a diagram of a message that may be generated by BP system 120-*m* in this exemplary implementation. As described above with regard to FIG. 3, the message may include BP identifier 310, service name 320, and arguments 330. In this case, BP identifier 310 may include credentials and/or a unique identifier ("BP ABC") for the business partner associated with BP system 120-*m*. Service name 320 may include the name of the service ("activate service") that subscriber device 110-*n* desires to invoke. Arguments 330 may include three arguments: argument 330-1 (corresponding to the subscriber identifier "subscriber 1234"), argument 330-2 ("firewall"), and argument 330-3 ("port 139").

Returning to FIG. 5, BP system 120-*m* may send the message to service gateway 130. Service gateway 130 may receive the message (act 505) (FIG. 5A). Service gateway 130 may then optionally authenticate BP system 120-*m* in a conventional manner using BP identifier 310 ("BP ABC") from the message (act 510). As described above, this authentication might include verification of the credentials and/or a determination of whether this particular business partner ("BP ABC") is permitted to communicate with service gateway 130. If the authentication fails, then service gateway 130 may reject the message (acts 515 and 520), and possibly notify BP system 120-*m* to that effect.

If the authentication succeeds, then service gateway 130 may perform access control with regard to the message (acts 515 and 525). For example, service gateway 130 may determine whether this particular business partner ("BP ABC") can access the particular service ("activate service") that is specified by service name 320 (FIG. 6). Service gateway 130 may also determine whether the particular arguments 330-2 and 330-3 ("firewall" and "port 139," respectively) are valid and permissible for this particular business partner ("BP ABC") and this particular service name 320 ("activate service"). To facilitate these determinations, service gateway 130 may access a server or database that identifies the services that this business partner is permitted to access and what arguments this business partner is permitted to provide for each of these services. If any of these determinations fail, then service gateway 130 may reject the message (acts 520 and 530) and possibly notify BP system 120-*m* to that effect.

If all of these determinations are satisfactory, then service gateway 130 may identify one of SAE servers 140 (e.g., SAE server 140-*x*) to which to send the message (acts 530 and 535) (FIG. 5B). For example, service gateway 130 may use the subscriber identifier ("subscriber 1234") to identify the particular one of SAE servers 140 on which to invoke the functionality requested in the message. To accomplish this, service gateway 130 may send the subscriber identifier to SAE locator 150 to obtain identification of one of SAE servers 140 that is currently managing router 170-*z* to which subscriber device 110-*n*, which corresponds to the subscriber identifier, is connected. Service gateway 130 may then forward the entire message (or a portion of it) onto the identified SAE server 140-*x* (act 540).

ESAC 145 of the identified SAE server 140-*x* may receive the message (or portion of the message) and perform the requested service (act 545). In this exemplary implementation, ESAC 145 may instruct SAE server 140-*x* to activate its firewall service and control router 170-*z* to which subscriber device 110-*n* connects to provide the firewall service. ESAC 145 may generate a response to the message based, at least in part, on a result of performance of the requested service. As described above, the response may take different forms, such as, for example, a success/failure indicator, a XML document, a HTML document, and/or a data structure. ESAC 145 may forward the response to service gateway 130. Service gateway 130 may receive the response from ESAC 145 and forward it to BP system 120-*m* (act 550).

While the above processing has described certain operations as being performed at service gateway 130 and other operations as being performed at SAE server 140-*x*, this need not be the case. There may be a balancing of requests and responses based, at least in part, on the complexity of the operations performed by SAE server 140-*x*. For example, if SAE server 140-*x* performs simple operations, then a more sophisticated operation may require many messages to be forwarded to SAE server 140-*x* and many responses returned. This is expensive in terms of network traffic. On the other hand, when SAE server 140-*x* performs more sophisticated operations, fewer messages are required to be forwarded to SAE server 140-*x* and also fewer responses returned. As a result, this is less expensive in terms network traffic.

Also, functionality can be distributed as needed to perform a particular operation. It may be beneficial to place certain functionality at the location of the data needed for the functionality to reduce the need for excessive network communication. For example, some or all of the functionality can be placed at SAE servers 140, service gateway 130, BP systems 120, or some combination of these.

As an example, assume that two subscriber devices 110 associated with two different SAE servers 140 desire to participate in a video conference and each of subscriber devices 110 requests special treatment for the video conference data transmitted between them. In this case, service gateway 130 may include logic to handle some of the service activation instead of, or in addition to, logic at SAE servers 140.

CONCLUSION

Systems and methods consistent with the principles of the invention provide mechanisms for exposing arbitrary functionality to business partners with a low maintenance common interface and strict, customized access control. The common interface can be extended by adding code and selectively exposing the code to the business partners via the strict, customized access control.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5A and 5B, the order of the acts may be varied in other implementations consistent with the present invention. Moreover, non-dependent acts may be implemented in parallel.

Also, a network service provider's network has been described as including a single service gateway 130. In other implementations, a network service provider's network may include multiple service gateways.

Moreover, it has been described that a subscriber may request particular functionality from a network service provider. It may be beneficial to note that this functionality may affect more than one subscriber. For example, a subscriber might ask a BP system 120-*m* to initiate a voice-over-IP telephone call to another subscriber of the same or a different one of BP systems 120. The message that BP system 120-*m* sends to service gateway 130 may identify both subscribers. Service gateway 130 may contact SAE servers 140 associated with the subscribers. Both SAE servers 140 may then be involved in providing the voice-over-IP service.

Further, while specific devices and their corresponding functions were described above with respect to FIGS. 1-6, in other implementations consistent with the principles of the invention, some devices in FIG. 1 may perform the functions of other devices in FIG. 1. For example, as described above, service gateway 130, or BP systems 120, may perform one or more of the functions of SAE servers 140. Therefore, implementations consistent with the principles of the invention are not necessarily limited to a particular configuration.

Moreover, it will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system, comprising:
a service gateway in communication with a first entity and a second entity, the service gateway comprising:
a first interface module to receive, from the first entity, a message requesting performance of a service in an extensible set of services offered by the second entity, the message including a service name that corresponds to the service and an argument that includes data used to perform the service;
an access control module to:
make a first determination of whether the first entity is permitted to request performance of the service corresponding to the service name,
make a second determination of whether the argument is permitted to be provided by the first entity, and
make a third determination of whether the argument is permitted to be requested for the service corresponding to the service name; and
a second interface module to selectively request performance of the service by the second entity based, at least in part, on results of the first, second, and third determinations of the access control module.

2. The system of claim 1, where the second entity includes:
a service activation component offering the extensible set of services.

3. The system of claim 2, where the service activation component is to configure a router to deliver the service.

4. The system of claim 1, where the first entity corresponds to a business partner system and the second entity corresponds to a service activation component, the service activation component provides the service to a customer associated with the business partner system, the business partner system generates the message requesting service for the customer; and
where the first interface module is further to:
authenticate the business partner system based, at least in part, on information included in the message.

5. The system of claim 1, where the first entity includes a plurality of service activation components; and
where the system further comprises:
a second entity locator to obtain information associated with the service activation components; and
where the second interface module is further to:
contact the second entity locator to identify one of the service activation components from which to request performance of the service.

6. The system of claim 5, where the message includes a subscriber identifier that identifies a subscriber on whose behalf the service is being requested; and
where the second entity locator is to map the subscriber identifier to the identified one of the service activation components.

7. The system of claim 1, further comprising:
an extension manager to facilitate at least one of modification of services in the extensible set of services or addition of new services to the extensible set of services offered by the second entity.

8. The system of claim 1, where the extensible set of services includes network services associated with communication on the Internet.

9. The system of claim 1, where the access control module is further to reject the message if the first determination determines that the first entity is not permitted to request performance of the service, the second determination determines that the argument is not permitted to be provided by the first entity, or the third determination determines that the argument is not permitted to be requested for the service.

10. The system of claim 1, where the second interface module is configured to request performance of the service when the first determination determines that the first entity is permitted to request performance of the service, the second determination determines that the argument is permitted to be provided by the first entity, and the third determination determines that the argument is permitted to be requested for the service.

11. A wholesaler system that provides services to subscribers associated with a plurality of retailer systems, the wholesaler system comprising:
   a service activation component to provide the services to the subscribers; and
   a service gateway to act as a single point of contact between the retailer systems and the service activation component, the service gateway providing controlled access, by the retailer systems, to the services provided by the service activation component, the service gateway permitting each of the retailer systems access to a subset of the services provided by the service activation component via the controlled access, the service gateway comprising:
      a first interface module to receive, from one of the retailer systems, a message requesting performance of one of the services by the service activation component, the message including at least one argument that includes data used to perform the one service,
      an access control module to:
         make a first determination of whether the one retailer system is permitted to request performance of the one service,
         make a second determination of whether the at least one argument is permissible for the one retailer system, and
         make a third determination of whether the at least one argument is valid for the one service, and
      a second interface module to selectively interact with the service activation component based, at least in part, on the first, second, and third determinations of the access control module.

12. The wholesaler system of claim 11, where the services provided by the service activation component include network services.

13. The wholesaler system of claim 11, where the services provided by the service activation component include an extensible set of services.

14. The wholesaler system of claim 11, where the service gateway and the service activation component in combination provide a common interface via which the retailer systems request one or more of the services provided by the service activation component, the combination exposing subsets of the common interface to each of the retailer systems by controlling access to the services by the retailer systems.

15. A method performed by a service gateway in communication with a first entity and a second entity, the method comprising:
   receiving, from the first entity, a message requesting performance of a network service of an extensible set of network services offered by the second entity, the message including a service name that corresponds to the network service and an argument that includes data used to perform the network service;
   generating a first result based, at least in part, on a determination of whether the first entity is permitted to request performance of the network service corresponding to the service name;
   generating a second result based, at least in part, on a determination of whether the first entity is permitted to provide the argument;
   generating a third result based, at least in part, on a determination of whether the argument is permissible for the network service corresponding to the service name; and
   selectively requesting performance of the network service by the second entity based, at least in part, on the first, second, and third results.

16. The method of claim 15, further comprising:
   rejecting the message if the first result indicates that the first entity is not permitted to request performance of the network service, the second result indicates that the first entity is not permitted to provide the argument, or the third result indicates that the argument is not permissible for the network service.

17. The method of claim 15, further comprising:
   configuring a router to deliver the network service to a subscriber.

18. The method of claim 15, further comprising:
   authenticating the first entity based, at least in part, on information included in the message.

19. The method of claim 15, where the message includes a subscriber identifier that identifies a subscriber on whose behalf the requested service is being requested; and
   where the method further comprises identifying the second entity from a plurality of second entities based, at least in part, on the subscriber identifier included in the message.

20. The method of claim 15, where the extensible set of network services includes network services associated with communication on the Internet.

21. The method of claim 15, where selectively requesting performance of the network service includes:
   requesting performance of the network service when the first result indicates that the first entity is permitted to request performance of the network service, the second result indicates that the first entity is permitted to provide the argument, and the third result indicates that the argument is permissible for the network service.

22. A device, comprising:
   means for receiving, from a requester, a message requesting performance of one of a plurality of network services offered by a server, the message including an argument that includes data used to perform the one network service;
   means for performing a first determination of whether the requestor is permitted to request performance of the one network service;
   means for performing a second determination of whether the requestor is permitted to provide the argument;
   means for performing a third determination of whether the argument is permissible for the one network service; and
   means for requesting performance of the one network service by the server based, at least in part, on the first, second, and third determinations.

* * * * *